(12) United States Patent
Endo et al.

(10) Patent No.: US 7,711,175 B2
(45) Date of Patent: May 4, 2010

(54) IMAGE READING APPARATUS (75) Inventors: Takafumi Endo, Tokyo (JP); Shigeru Toyota, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1059 days.

(21) Appl. No.: 11/400,201

(22) Filed: Apr. 10, 2006

(65) Prior Publication Data
US 2007/0133858 A1 Jun. 14, 2007

(30) Foreign Application Priority Data
Dec. 13, 2005 (JP) ............... 2005-358384

(51) Int. Cl.
*G06K 9/00* (2006.01)
(52) U.S. Cl. ............... 382/137; 382/139; 382/140; 705/45
(58) Field of Classification Search ............... 194/206, 194/207, 212, 302, 303, 317, 318; 382/137, 382/139, 140; 705/45
See application file for complete search history.

(56) References Cited

U.S. PATENT DOCUMENTS

| 3,412,993 | A | * | 11/1968 | Giori ............... 270/1.02 |
| 4,723,072 | A | * | 2/1988 | Naruse ............... 235/454 |
| 4,737,649 | A | * | 4/1988 | Naruse ............... 250/559.11 |
| 5,489,992 | A | | 2/1996 | Endo |
| 6,172,745 | B1 | * | 1/2001 | Voser et al. ............... 356/71 |
| 6,529,269 | B1 | | 3/2003 | Sugata |
| 6,969,838 | B2 | | 11/2005 | Endo et al. |
| 2004/0035932 | A1 | * | 2/2004 | Bailleu et al. ............... 235/454 |
| 2006/0057467 | A1 | * | 3/2006 | Takizawa ............... 430/1 |

FOREIGN PATENT DOCUMENTS

| EP | 1 439 500 A1 | 7/2004 |
| EP | 1 471 472 A2 | 10/2004 |
| EP | 1 482 457 A2 | 12/2004 |
| JP | 599057107 A1 * | 9/1982 |

(Continued)

OTHER PUBLICATIONS

U.S. Appl. No. 11/427,130, filed Jun. 28, 2006, Endo et al.

(Continued)

*Primary Examiner*—Bhavesh M Mehta
*Assistant Examiner*—Gregory F Cunningham
(74) *Attorney, Agent, or Firm*—Oblon, Spivak, McClelland, Maier & Neustadt, L.L.P.

(57) ABSTRACT

An image reading apparatus includes a carrying unit that carries an irradiated object having a reflecting portion and a transmitting portion in a carrying direction, a first light source arranged on one face side of the irradiated object that irradiates light to an irradiated portion in a path of carrying the irradiated object, a second light source arranged on other face side that irradiates light to the irradiated portion, a detecting unit arranged to be spaced apart from the irradiated portion by a predetermined distance that detects the transmitting portion, a lighting control unit that controls to put on the second light source during a time period of passing the transmitting portion through the irradiated portion, a lens array arranged on one face side of the irradiated object that converges reflecting light reflected by the reflecting portion and transmitting light, and a sensor that receives converged light.

19 Claims, 10 Drawing Sheets

FOREIGN PATENT DOCUMENTS

| | | |
|---|---|---|
| JP | 63-20576 | 1/1988 |
| JP | 7-318513 | 12/1995 |
| JP | 2000-113269 | 4/2000 |
| JP | 2000-331213 | 11/2000 |
| JP | 2003-87564 | 3/2003 |
| JP | 2004-355262 | 12/2004 |
| WO | WO 2004/027718 A1 | 4/2004 |
| WO | WO 2006/079810 A1 * | 8/2006 |

OTHER PUBLICATIONS

U.S. Appl. No. 12/191,006, filed Aug. 13, 2008, Endo, et al.
U.S. Appl. No. 11/467,399, filed Aug. 25, 2006, Endo, et al.
U.S. Appl. No. 12/466,761, filed May 15, 2009, Endo, et al.
U.S. Appl. No. 12/455,808, filed May 15, 2009, Endo, et al.

* cited by examiner

BLACK WATERMARK

| POSITION(mm) | | 0.25 | | 0.5 | | 1 | | 1.5 | | 2 |
|---|---|---|---|---|---|---|---|---|---|---|
| 0.5 | 100 | 80 | 80 | 85 | 80 | 80 | 80 | 80 | 80 | 85 |
| 1 | 100 | 80 | 75 | 65 | 80 | 80 | 75 | 75 | 75 | 80 |
| 1.5 | 175 | 180 | 180 | 175 | 175 | 175 | 170 | 170 | 170 | 180 |
| 2 | 180 | 180 | 180 | 180 | 175 | 175 | 175 | 175 | 170 | 180 |
| 2.5 | 180 | 180 | 180 | 180 | 170 | 170 | 170 | 170 | 170 | 165 |
| 3 | 180 | 180 | 180 | 180 | 170 | 170 | 170 | 170 | 165 | 160 |
| 3.5 | 175 | 175 | 175 | 175 | 175 | 170 | 170 | 170 | 165 | 160 |
| 4 | 175 | 175 | 175 | 175 | 175 | 165 | 165 | 165 | 160 | 160 |
| 4.5 | 170 | 170 | 170 | 170 | 170 | 165 | 165 | 160 | 160 | 155 |
| 5 | 180 | 180 | 180 | 180 | 180 | 150 | 145 | 145 | 140 | 170 |
| 5.5 | 180 | 180 | 180 | 180 | 180 | 150 | 140 | 135 | 140 | 160 |
| 6 | 175 | 175 | 175 | 175 | 175 | 150 | 135 | 135 | 135 | 160 |
| 6.5 | 170 | 170 | 170 | 170 | 170 | 145 | 135 | 170 | 135 | 155 |
| 7 | 180 | 180 | 180 | 180 | 180 | 150 | 135 | 180 | 145 | 150 |
| 7.5 | 180 | 180 | 180 | 180 | 180 | 150 | 140 | 130 | 145 | 160 |
| 8 | 175 | 175 | 175 | 175 | 175 | 160 | 140 | 140 | 140 | 150 |
| 8.5 | 170 | 170 | 170 | 170 | 170 | 160 | 145 | 150 | 150 | 165 |
| 9 | 165 | 165 | 165 | 165 | 165 | 165 | 145 | 160 | 165 | 165 |
| 10 | 160 | 160 | 160 | 160 | 160 | 165 | 160 | 135 | 170 | 170 |
| 10.5 | 175 | 175 | 175 | 175 | 175 | 175 | 175 | 180 | 180 | 180 |
| 11 | 175 | 175 | 175 | 175 | 175 | 180 | 180 | 180 | 180 | 180 |
| 11.5 | 175 | 175 | 175 | 175 | 175 | 180 | 180 | 180 | 180 | 180 |
| 12 | 100 | 85 | 80 | 65 | 65 | 70 | 80 | 80 | 85 | 75 |
| 12.5 | 95 | 90 | 85 | 70 | 70 | 70 | 80 | 80 | 80 | 80 |
| 13 | 95 | 95 | 90 | 80 | 95 | 80 | 75 | 75 | 75 | 75 |
| 13.5 | 100 | 85 | 90 | 85 | 85 | 85 | 75 | 80 | 80 | 80 |
| ... | | | | | | | | | | |
| 80 | | | | | | | | | | |

MAIN SCANNING DIRECTION IMAGE ↕    WATERMARK REGION ↕

← CARRYING DIRECTION IMAGE →

FIG. 6B

BLACK WATERMARK

| POSITION(mm) | | 0.25 | | 0.5 | | 1 | | 1.5 | | 2 |
|---|---|---|---|---|---|---|---|---|---|---|
| 1.5 | -5 | 0 | 0 | -5 | -5 | -5 | -10 | -10 | -10 | -10 |
| 2 | 0 | 0 | 0 | 0 | -5 | -5 | -5 | -5 | -10 | -10 |
| 2.5 | 0 | 0 | 0 | 0 | -10 | -10 | -10 | -10 | -10 | -15 |
| 3 | 0 | 0 | 0 | 0 | -10 | -10 | -10 | -10 | -15 | -20 |
| 3.5 | -5 | -5 | -5 | -5 | -5 | -10 | -10 | -10 | -15 | -20 |
| 4 | -5 | -5 | -5 | -5 | -5 | -15 | -15 | -15 | -20 | -20 |
| 4.5 | -10 | -10 | -10 | -10 | -10 | -15 | -15 | -20 | -20 | -25 |
| 5 | 0 | 0 | 0 | 0 | 0 | -30 | -35 | -35 | -40 | -10 |
| 5.5 | 0 | 0 | 0 | 0 | 0 | -30 | -40 | -45 | -40 | -20 |
| 6 | -5 | -5 | -5 | -5 | -5 | -30 | -45 | -45 | -45 | -20 |
| 6.5 | -10 | -10 | -10 | -10 | -10 | -35 | -45 | -45 | -45 | -25 |
| 7 | 0 | 0 | 0 | 0 | 0 | -30 | -45 | -50 | -35 | -30 |
| 7.5 | 0 | 0 | 0 | 0 | 0 | -30 | -40 | -45 | -35 | -20 |
| 8 | -5 | -5 | -5 | -5 | -5 | -20 | -40 | -40 | -40 | -30 |
| 8.5 | -10 | -10 | -10 | -10 | -10 | -20 | -35 | -30 | -30 | -15 |
| 9 | -15 | -15 | -15 | -15 | -15 | -15 | -35 | -15 | -15 | -15 |
| 10 | -20 | -20 | -20 | -20 | -20 | -15 | -20 | -15 | -10 | -10 |
| 10.5 | -5 | -5 | -5 | -5 | -5 | -5 | 5 | 0 | 0 | 0 |
| 11 | -5 | -5 | -5 | -5 | -5 | 0 | 0 | 0 | 0 | 0 |
| 11.5 | -5 | -5 | -5 | -5 | -5 | 0 | 0 | 0 | 0 | 0 |

TAKE OUT WATERMARK REGION AND CALCULATE DIFFERENCE FROM REFERENCE OF 180

IMAGE READING APPARATUS

BACKGROUND OF THE INVENTION

1. Field of the Invention

The present invention relates to an image reading apparatus for reading an image of an irradiated object having a portion of reflecting and a portion of transmitting light as in a banknote or the like.

2. Description of the Related Art

In a background art, there is an image reading apparatus of this kind described in, for example, JP-A-2000-113269. That is, JP-A-2000-113269 describes a banknote examining apparatus for examining a banknote or the like by irradiating light to a watermark pattern of a banknote or the like, detecting light transmitted therethrough by an artificial retina chip, and processing information of a shape or the like and presence or absence of an watermark image by a knowledge processing circuit.

On the other hand, JP-A-2003-87564 describes an image reading apparatus using both of a so-to-speak transmitting type and reflecting type. Further, according to the image reading apparatus, there is described an image reading apparatus constituted such that a light source for a transmitting draft is contained in a draft cover, a draft mat is locked by the draft cover attachably thereto and detachably therefrom, whereas in reading a reflecting draft, the draft mat is mounted to the draft cover, in reading the transmitting draft, the draft mat is detached from the draft cover.

However, according to the banknote examining apparatus described in JP-A-2000-113269, there poses a problem that although a watermark portion of the banknote or the like can be examined, in order to examine a portion of reflecting light of the banknote or the like other than the watermark portion, the banknote or the like needs to pass the bank examining apparatus again.

Further, according to the image reading apparatus described in JP-A-2003-87564, although there is conceivable an apparatus using both of an image reading apparatus of a so-to-speak transmitting type (hereinafter, simply referred to as "transmitting type") and an image reading apparatus of a reflecting type (hereinafter, simply referred to as "reflecting type"), in reading a reflecting portion of a draft and in reading a transmitting portion of the draft, there is needed troublesome time and labor of attaching and detaching the draft mat to and from the draft cover in accordance therewith to pose a problem that so far as the draft mat is attached thereto and detached therefrom, the meaning of combining the reflecting type and the transmitting type cannot sufficiently be achieved. Further, there is conceivable a case of simultaneously reading a reflecting portion and a transmitting portion of a draft by carrying a draft only once by installing a reflecting type and a transmitting type in parallel in a direction of carrying the draft. However, in this case, there poses a problem that the image reading apparatus per se is large-sized and is not efficient.

SUMMARY OF THE INVENTION

The invention has been carried out in order to resolve the problem of the background art and it is an object thereof to provide a small-sized and efficient image reading apparatus constituted by combining a so-to-speak reflecting type and a transmitting type, capable of reading both of a reflecting portion and a transmitting portion of light of an irradiated object by carrying the irradiated object only once with regard to the irradiated object having the reflecting portion and the transmitting portion of light.

According to a first aspect of the present invention, an image reading apparatus includes a carrying unit that carries an irradiated object having a light reflecting portion and a light transmitting portion in a carrying direction, a first light source arranged on one face side of the irradiated object that irradiates light to a light irradiated portion in a path of carrying the irradiated object, a second light source arranged on other face side of the irradiated object that irradiates light to the irradiated portion, a detecting unit arranged to be spaced apart from the irradiated portion by a predetermined distance in a direction reverse to the carrying direction that detects the transmitting portion of the irradiated object, a lighting control unit that controls to put on the second light source during a time period of passing the transmitting portion through the irradiated portion by the detecting unit, a lens array arranged on the one face side of the irradiated object that converges reflecting light reflected by the reflecting portion of the irradiated object at the irradiated portion and transmitting light transmitting the transmitting portion thereof, and a sensor that receives light converged by the lens array.

According to a second aspect of the present invention, an image reading apparatus includes a carrying unit that carries an irradiated object having a light reflecting portion and a light transmitting portion in a carrying direction, a first light source arranged on one face side of the irradiated object that irradiates light to a light irradiated portion in a path of carrying the irradiated object, a second light source arranged on other face side of the irradiated object that irradiates light to the irradiated portion, a detecting unit arranged to be spaced apart from the irradiated portion by a predetermined distance in a direction reverse to the carrying direction that detects the transmitting portion of the irradiated object, a lighting control unit that controls to put on the second light source during a time period of passing the transmitting portion through the irradiated portion by the detecting unit, a lens array arranged on the one face side of the irradiated object that converges reflecting light reflected by the reflecting portion of the irradiated object at the irradiated portion and transmitting light transmitting the transmitting portion thereof, a sensor that receives and photoelectrically converts light converged by the lens array, and a checking unit that checks true or false of the irradiated object based on an output signal of the sensor.

According to a third aspect of the present invention, in the image reading apparatus according to the first or second aspect, the detecting unit is constituted by a light emitting element and a light receiving element and the irradiated object is carried between the light emitting element and the light receiving element.

According to a fourth aspect of the present invention, in the image reading apparatus according to the first or second aspect, the carrying unit carries the irradiated object at a constant speed, the lighting control unit puts on the second light source and puts off the first light source after an elapse of a constant time period from when the transmitting portion of the irradiated object is detected by the detecting unit.

According to a fifth aspect of the present invention, in the image reading apparatus according to the first or second aspect, the plurality of detecting units are provided in a direction orthogonal to the direction of carrying the irradiated object, the second light source is divided in correspondence with respectives of the detecting unit and lighting is carried out by the lighting control unit for respective divided regions thereof.

According to a sixth aspect of the present invention, in the image reading apparatus according to the fifth aspect, the second light source is an infrared ray light source.

According to a seventh aspect of the present invention, in the image reading apparatus according to the second aspect, the checking unit compares a digital output signal constituted by converting the output signal of the sensor at the transmitting portion of the irradiated object by A/D conversion and an image signal of the transmitting portion of the irradiated object stored to a storing unit.

According to an eighth aspect of the present invention, in the image reading apparatus according to the second aspect, the checking unit compares a digital output signal constituted by deleting a digital output signal at the transmitting portion of the irradiated object having a level equal to or smaller than a predetermined level and a digital image signal of the transmitting portion of the irradiated object stored to a storing unit.

According to a ninth aspect of the present invention, in the image reading apparatus according to the seventh or eighth aspect, the checking unit includes an averaging unit that averages the output signal at the transmitting portion of the irradiated object.

According to a tenth aspect of the present invention, in the image reading apparatus according to the seventh or eighth aspect, the checking unit includes a register that holds the digital output signals at respective scanning lines.

According to a eleventh aspect of the present invention, in the image reading apparatus according to the seventh aspect, the storing unit is stored with an image data of a black watermark portion or a white watermark portion, or an image data of a data of a region coated with a fluorescent ink.

According to a twelfth aspect of the present invention, an image reading apparatus includes a carrying unit that carries an irradiated object having a light reflecting portion and a light transmitting portion and coated with a fluorescent ink at the transmitting portion in a carrying direction, a first light source arranged on one face side of the irradiated object that irradiates light to an irradiated portion of light in a path of carrying the irradiated object, a second light source arranged on other face side of the irradiated object that irradiates an ultraviolet ray to the irradiated portion, a detecting unit arranged to be spaced apart from the irradiated portion by a predetermined distance in a direction reverse to the carrying direction, a lighting control unit that controls to put on the second light source and put off the first light source during a time period of passing the transmitting portion through the irradiated portion by the detecting unit, a lens array that converges reflecting light reflected by the reflecting portion of the irradiated object at the irradiated portion and transmitting light transmitting through the transmitting portion, and a sensor that receives light converged by the lens array.

According to a thirteenth aspect of the present invention, an image reading apparatus includes a carrying unit that carries an irradiated object having a light reflecting portion and a light transmitting portion and coated with a fluorescent ink at the transmitting portion in a carrying direction, a first light source arranged on one face side of the irradiated object that irradiates light to an irradiated portion of light in a path of carrying the irradiated object, an ultraviolet ray cut filter provided at the irradiated portion between the first light source and the irradiated object that removes an ultraviolet ray, a second light source arranged on other face side of the irradiated object that irradiates an ultraviolet ray to the irradiated portion, a detecting unit arranged to be spaced apart from the irradiated portion by a predetermined distance in a direction reverse to the carrying direction, a lighting control unit that controls to put on the second light source and put off the first light source during a time period of passing the transmitting portion through the irradiated portion by the detecting unit, a lens array arranged on the one face side of the irradiated object that converges reflecting light reflected by the reflecting portion of the irradiated object at the irradiated portion and transmitting light transmitting through the transmitting portion thereof, and a sensor that receives light converged by the lens array.

According to the invention, there is achieved an effect of capable of reading the light reflecting portion and the light transmitting portion by carrying the irradiated object by once with regard to the irradiated object having the light reflecting portion and the light transmitting portion.

BRIEF DESCRIPTION OF THE DRAWINGS

FIGS. 3A and 3B illustrate block diagrams of the image reading apparatus according to Embodiment 1 of the invention.

DESCRIPTION OF THE RELATED ART

Embodiment 1

Constitution

Figure 1:
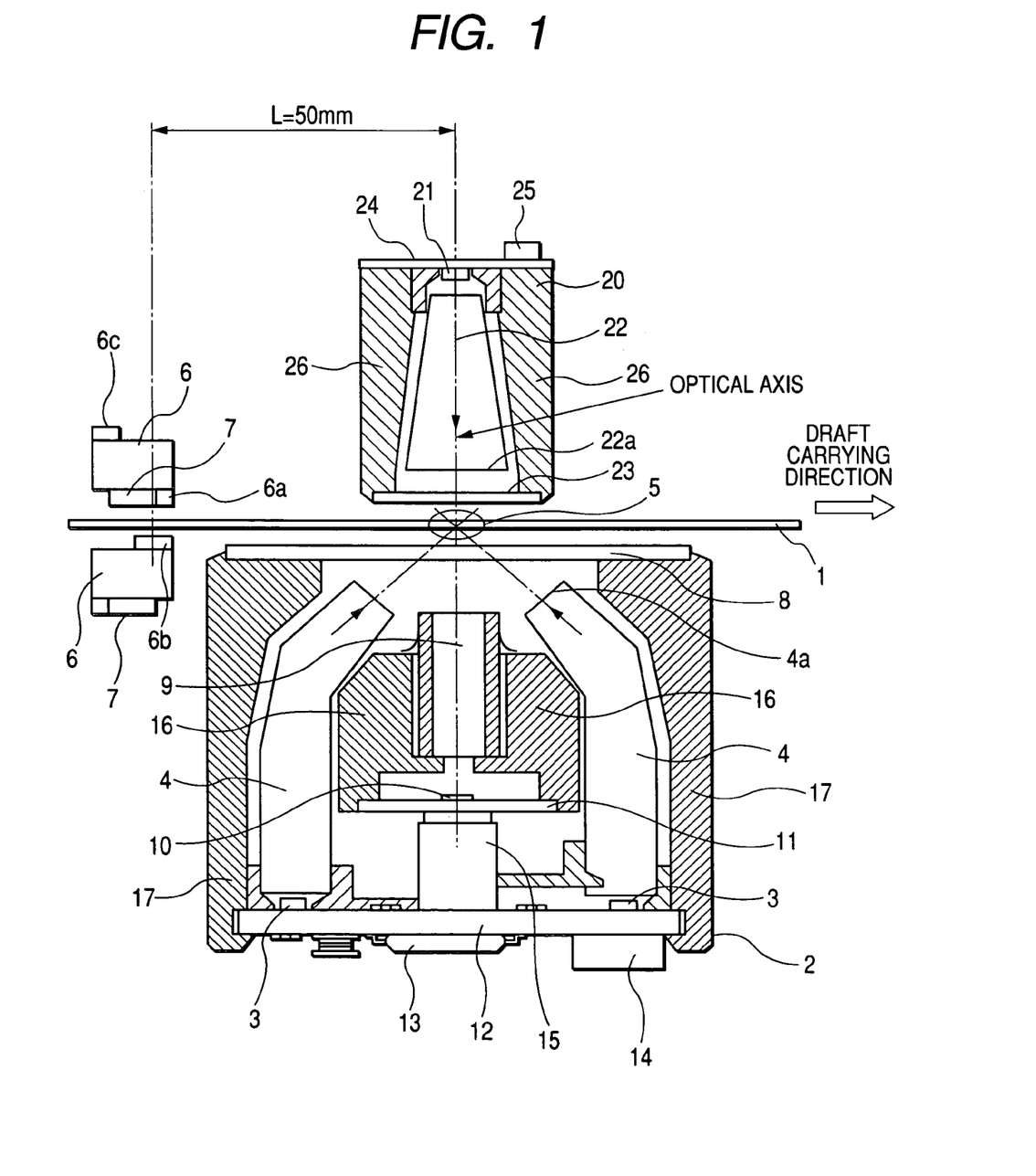
FIG. 1 is a sectional constitution view of an image reading apparatus according to Embodiment 1 of the invention.
Figure 2:
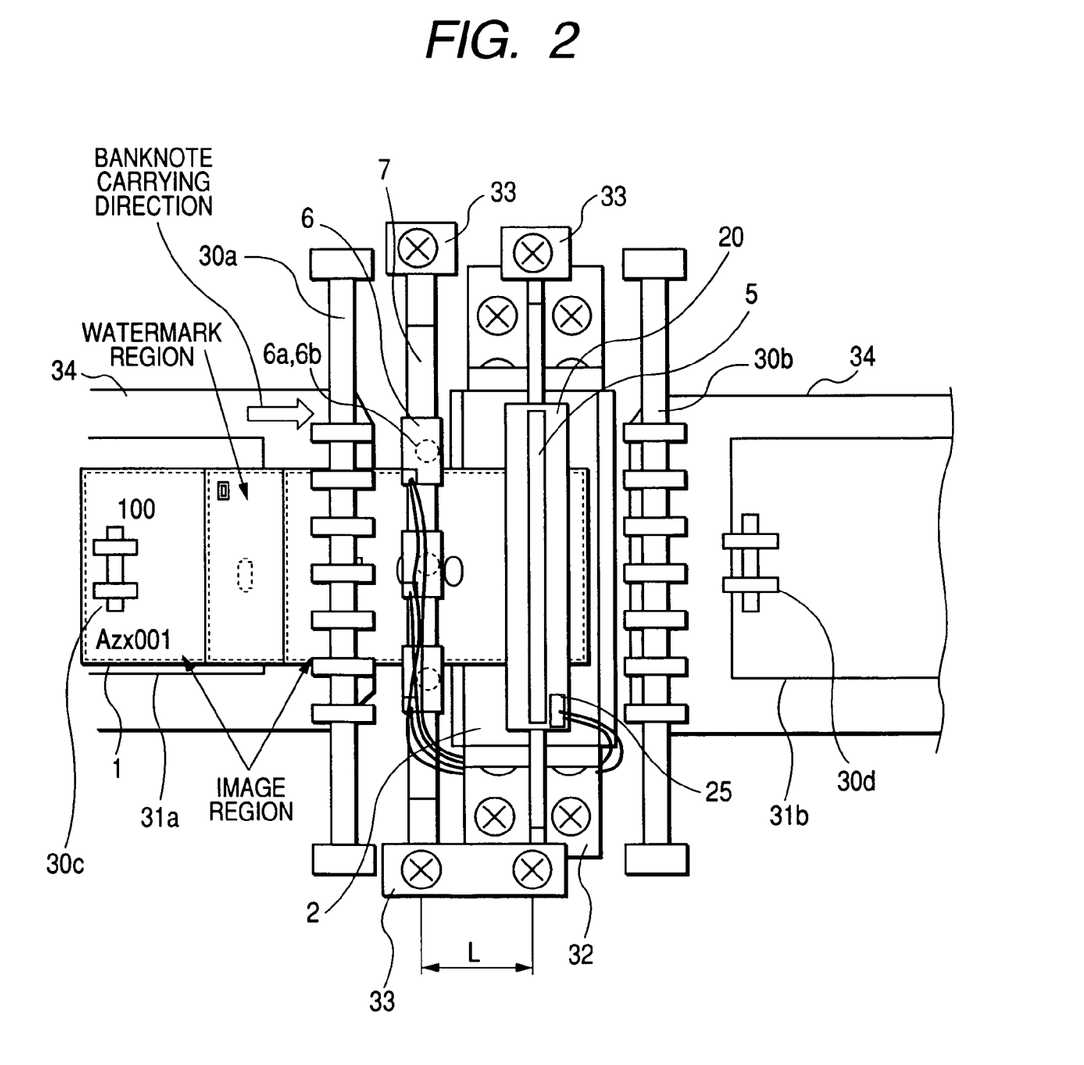
FIG. 2 is a plane constitution view of the image reading apparatus according to Embodiment 1 of the invention.

Embodiment 1 of the invention will be explained in reference to FIG. 1, FIG. 2 as follows. FIG. 1 is a sectional constitution view of an image reading apparatus according to Embodiment 1. FIG. 2 is a plane constitution view of the image reading apparatus. In FIG. 1, FIG. 2, numeral 1 designates an irradiated object of, for example, a banknote, securities, a check or the like (hereinafter, simply referred to as "draft" or "banknote") which includes a semitransparent or transparent watermark portion (hereinafter, also referred to as a transmitting portion) and a reflecting portion through which light is not transmitted. Here, as shown by FIG. 2, the transmitting portion is formed by a width which is constant in a direction of transmitting the draft 1 from one end over to other end in a direction orthogonal thereto.

Numeral 2 designates a closely attached image sensor (hereinafter, simply referred to as "CIS") arranged on one face side (lower side of FIG. 1) of the draft 1. Numeral 3 designates a first light source (hereinafter, referred to as a reflecting type light source) arranged on both sides of CIS2, which is arranged on the one face side of the draft 1 and linearly aligned with LED chips in an array shape over a width direction (main scanning direction) of the draft 1. Numeral 4 designates a refractive type light guiding member for guiding light such that light emitted from each reflecting type light source 3 is irradiated to an irradiated portion 5 of the draft 1, which includes a light emitting section 4a. The irradiated portion 5 is a portion in a shape of a linear line in the main scanning direction at which light from the reflecting type light source 3 is irradiated to the draft 1 at a path of carrying the draft 1 and signifies a read portion of the carried draft 1.

Numeral 6 designates a detecting unit (hereinafter, simply referred to as "photosensor") constituted by a separated type photosensor having a light emitting element 6a and a light receiving element 6b and is provided to extend from one to other end of the draft 1 in the main scanning direction of the draft 1. The photosensor 6 is provided with a connector 6c and is provided with a stay 7 for supporting the photosensor 6. The photosensor 6 is provided to be spaced apart from the irradiated portion 5 by a predetermined distance (L=50 mm) in a direction reverse to a direction of carrying the draft 1 and is constituted such that the draft 1 is carried between the light emitting element 6a and the light receiving element 6b. Further, with regard to the photosensor 6, although light emitted from the light emitting element 6a does not reach the light receiving element 6b by being reflected by a reflecting portion of the draft 1, with regard to the transmitting portion of the draft 1, the light reaches the light receiving element 6b by transmitting the transmitting portion. At this occasion, the photosensor 6 receives the light by the light receiving element 6b until the transmitting portion of the draft 1 finishes to pass.

Numeral 8 designates a transmitting member having a function of preventing a foreign matter or the like from mixing into CIS2 and the draft 1 is carried by being guided by an outer side of the transmitting member 8. Numeral 9 designates a rod lens array by which after light emitted from the reflecting type light source 3 is reflected on the one face side of the draft 1, reflected light thereof is converged, numeral 10 designates a light receiving section (sensor) that receives reflected light converged by the rod lens array 9 and is constituted by a sensor IC integrated with a plurality of photoelectric conversion sections, a drive circuit thereof and the like. Numeral 11 designates a sensor board mounted with a plurality of pieces of the light receiving sections (referred to also as sensor, sensor IC) 10, numeral 12 designates a board constituted by a printed wiring board or the like mounted with the reflecting type light sources 3 on both sides thereof.

Numeral 13 designates a signal processing IC (ASIC) integrated with a signal processing section including a correcting circuit for subjecting an analog signal photoelectrically converted by the light receiving section 10 to an A/D conversion and thereafter subjecting signal outputs of respective pixels (bits) to shading correction or all bits correction for outputting image information from the draft 1 as an image signal. Numeral 14 designates a connector supported by a back side of the board 12 for supplying power to a system signal (SCLK), a start signal (SI), a clock signal (CLK) and an input signal of a power source or the like and a light source or the like for driving CIS2, inputting and outputting a control signal and outputting an image signal (SIG) or the like to outside. Numeral 15 designates an intermediate connector for delivering a signal between the sensor board 11 and the board 12, numeral 16 designates an inner cabinet for containing and holding the rod lens array 9 and the sensor board 11, numeral 17 designates an outer cabinet for containing and holding the refractive type light guiding member 4, the transmitting member 8 and the board 12. Further, the inner cabinet 16 is held by the intermediate connector 15. As described above, the reflecting type is constituted by the reflecting type light source 3, the rod lens array 9 and the light receiving section 10 and the like.

On the other hand, numeral 20 designates a transmitting type light source member for emitting light in the main scanning direction of the draft 1. In the transmitting type light source member 20, numeral 21 designates a second light source (hereinafter, referred to as transmitting type light source) linearly aligned with LED chips in an array shape in the main scanning direction, numeral 22 designates a bugle type light guiding member for guiding light emitted from the transmitting type light source 21 to the draft 1, which includes a light emitting section 22a. Further, light emitted from the light emitting section 22a is constituted to be irradiated to the irradiated portion 5 in the path of carrying the draft 1.

Here, the irradiated portion 5 is made to coincide with the irradiated portion 5 irradiated by the reflecting type light source 3. According thereto, as shown by FIG. 1, there is constructed a constitution of arranging the transmitting type light source 21, the rod lens array 9 and the light receiving section 10 on an optical axis of the transmitting type light source 21 such that light emitted from the transmitting type light source 21 is focused to the light receiving section 10 by way of the rod lens array 9. Further, numeral 23 designates a transparent glass plate through which light transmits, numeral 24 designates an LED board mounted with an LED chip of the transmitting type light source 21, numeral 25 designates a connector supported by the LED board 24 for supplying power for driving the transmitting type light source 21, numeral 26 designates a cabinet for containing and holding the bugle type light guiding member 22, the glass plate 23 and the LED board 24. As described above, the transmitting type is constituted by the transmitting type light source 21, the rod lens array 9 and the light receiving section 10 and the like.

Further, in FIG. 2, a carrying unit is also illustrated. That is, numeral 30 designates a carrying roller and is constituted by a sheet feeding side roller 30a, a sheet discharging side roller 30b, a take out roller 30c of the draft 1, a take in roller 30d of the draft 1. The carrying roller 30 carries the draft 1 by driving a motor (not illustrated) based on a predetermined carrying signal. Numeral 31 designates a cassette for containing the draft 1 and includes a sheet feeding side cassette 31a, a sheet discharging side cassette 31b. Numeral 32 designates a receiving base for fixing CIS2, numeral 33 designates a holder for fixing the detecting unit 6 including the photosensor and the second light source (transmitting type light source) 21. Numeral 34 designates a draft base for mounting the draft 1.

Further, in FIG. 2, the photosensor 6 is fixed to the stay 7. The draft 1 mounted on an upper section of the sheet feeding side cassette 31a is successively carried to the irradiated portion 5 of a reading region of CIS2 by the carrying rollers 30c, 30a. In the path of carrying the draft 1, the photosensor 6 that detects the transmitting portion of the draft 1 provided with a black watermark, a white watermark or the like is installed to be spaced apart from the irradiated portion 5 by the predetermined distance L on the side reverse to the transmitting direction. Although in FIG. 2, 3 pieces of the photosensors 6 are provided at equal intervals in the main scanning direction of the draft 1, when the transmitting portion of the draft 1 is formed from the one end over to the other end in the main scanning direction of the draft 1 as shown by FIG. 2, the photosensor may be constituted by a single piece thereof. Further, the banknote 1 passing the reading region is contained in the cassette 31*b* by the carrying rollers 30*b*, 30*d*. Here, the carrying rollers 31*a* and 31*b* are driven in synchronism with each other such that the draft 1 is carried by a carrying speed of, for example, 250 mm/sec. Further, in FIG. 2, notations the same as those of FIG. 1 designate the same or corresponding portions.

Further, the reflecting type light source 3 and the transmitting type light source 21, the photosensor 6 and the outer cabinet 17 and the like are fixed to a main body of an image reading apparatus (reading system) of, for example, a money terminal apparatus.

(Putting Light Source On and Off)

In the image reading apparatus according to Embodiment 1, when the reflecting type light source 3 is put on during a time period of carrying the reflecting portion of the draft 1 through the irradiated portion 5, reflecting light reflected from the reflecting portion of the draft 1 at the irradiated portion 5 is focused to the light receiving section 10 by way of the rod lens array 9. At this occasion, the transmitting type light source 21 is put off. On the other hand, the transmitting type light source 21 is put on during a time period of carrying the transmitting portion of the draft 1 through the irradiated portion 5, transmitting light transmitted through a transmitting portion of the draft 1 is focused to the light receiving section 10 by way of the rod lens array 9. At this occasion, the reflecting type light source 21 is put off. Although here, the reflecting type light source 3 and the transmitting type light source 21 are put on and put off in this way, even when the transmitting type light source 21 is put on during a time period of putting the reflecting type light source on, light of the transmitting type light source 21 hardly effects an influence on reading the reflecting portion of the draft 1 even when the transmitting light source 21 is put on in a case in which the light is reflected by the reflecting portion of the draft 1 and is hardly received by the light receiving section 10 by way of the rod lens array 9.

On the other hand, when the reflecting type light source 3 is put on during the time period of putting the transmitting type light source 21 on, light of the reflecting type light source 3 transmits through the transmitting portion of the draft 1, however, there is a concern that a portion of the light is reflected by the transmitting portion of the draft 1 and is received by the light receiving section 10 and there is a possibility of effecting an influence on accurate reading at the transmitting portion of the draft 1. Therefore, in such a case, it is preferable to put the reflecting type light source 3 off during the time period of putting the transmitting type light source 21 on.

(Control of Putting Light Source On and Off)

Figure 3A:
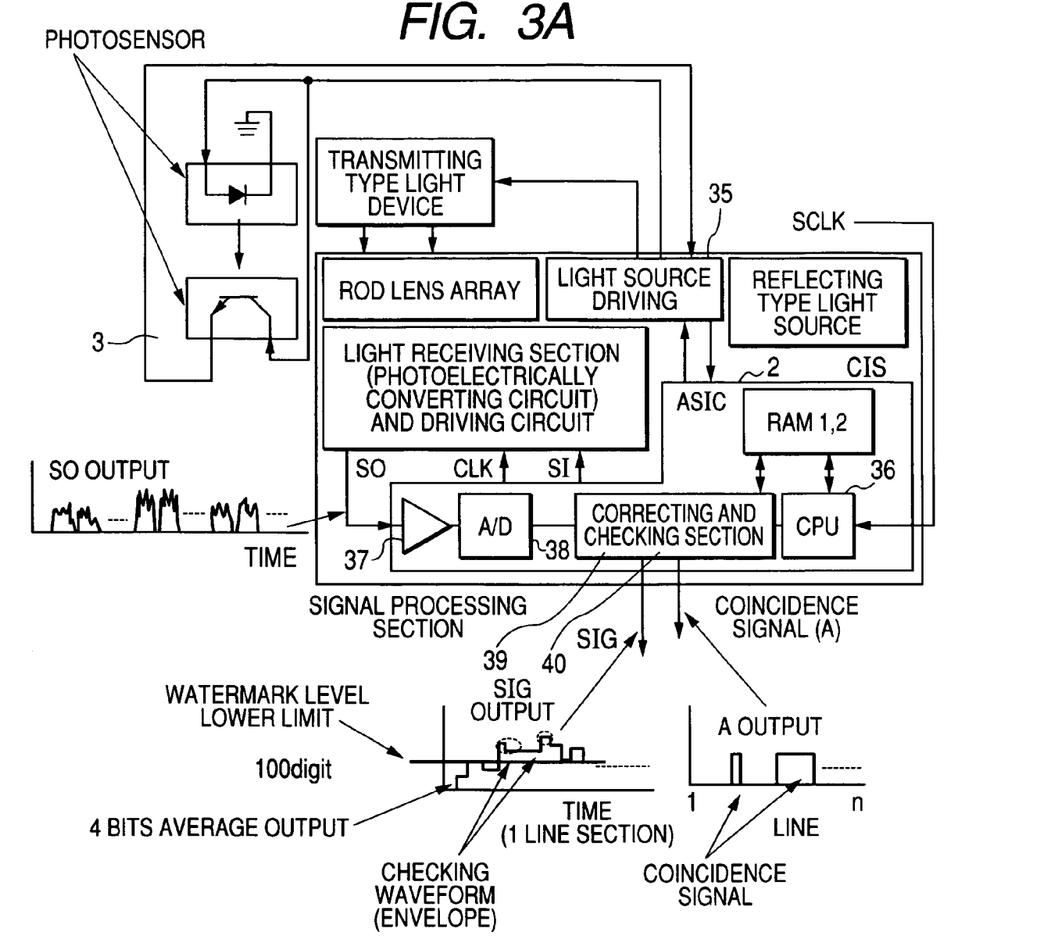
FIG. 3A is a total block constitution view.
Figure 3B:
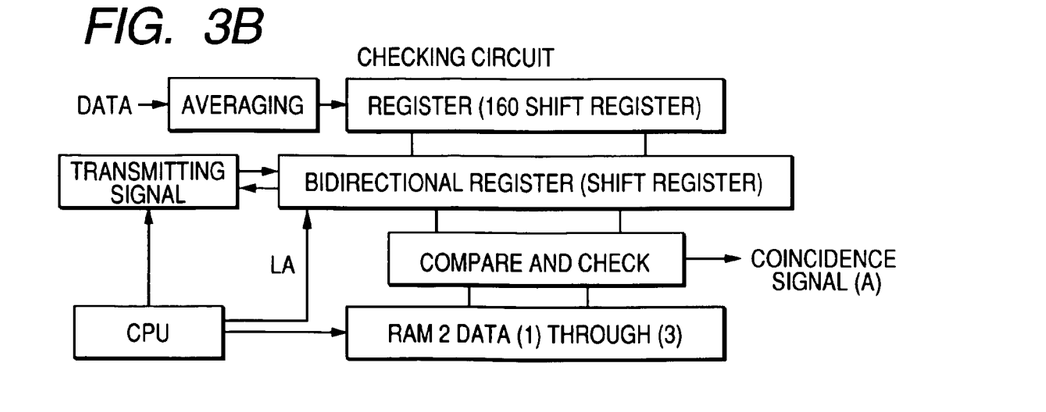
FIG. 3B is a block constitution diagram of a checking circuit.

Next, FIGS. 3A and 3B illustrate block constitution diagrams of the image reading apparatus according to Embodiment 1. In FIG. 3A, numeral 35 designates a light source driving circuit for putting on and putting off the reflecting type light source 3 and the transmitting type light source 21. Numeral 36 designates a control section (CPU) for controlling the light source driving circuit 35. That is, a timing signal of first detecting the transmitting portion of the draft 1 by the photosensor 6 is inputted to CPU 36. At this occasion, when a speed of carrying the draft 1 is constant, after an elapse of a time period in correspondence with the predetermined distance L between the photosensor 6 and the irradiated portion 5, the transmitting portion of the draft 1 enters the irradiated portion 5 and therefore, the light source driving circuit 35 is controlled to be driven by the timing to put on the transmitting type light source section 21, on the other hand, put off the reflecting type light source 3. Further, CPU 36 controls the light source driving circuit 35 to continue putting on the transmitting type light source 21 and putting off the reflecting type light source 3 by a time period of detecting the transmitting portion of the draft 1 by the photosensor 6.

On the other hand, after CPU 36 is inputted with a reading system signal (SCLK), during a time period in which the photosensor 6 does not detect the transmitting portion of the draft 1, CPU 36 determines that the reflecting portion of the draft 1 passes and controls to drive the light source driving circuit 35 such that the reflecting type light source 3 is put on and the transmitting type light source 21 is put off. In this way, the reflecting type light source 3 and the transmitting type light source 21 are controlled to put on and put off by controlling to drive the light source driving circuit 35 by CPU 36. Further, numeral 37 designates a variable amplifier for amplifying an analog signal, numeral 38 designates an A/D (analog to digital) converter for converting the analog signal into a digital signal, numeral 39 designates a correcting circuit, numeral 40 designates a checking circuit. In the drawings, notations the same as those of FIG. 1 and FIG. 2 designate the same or corresponding portions.

Figure 4:
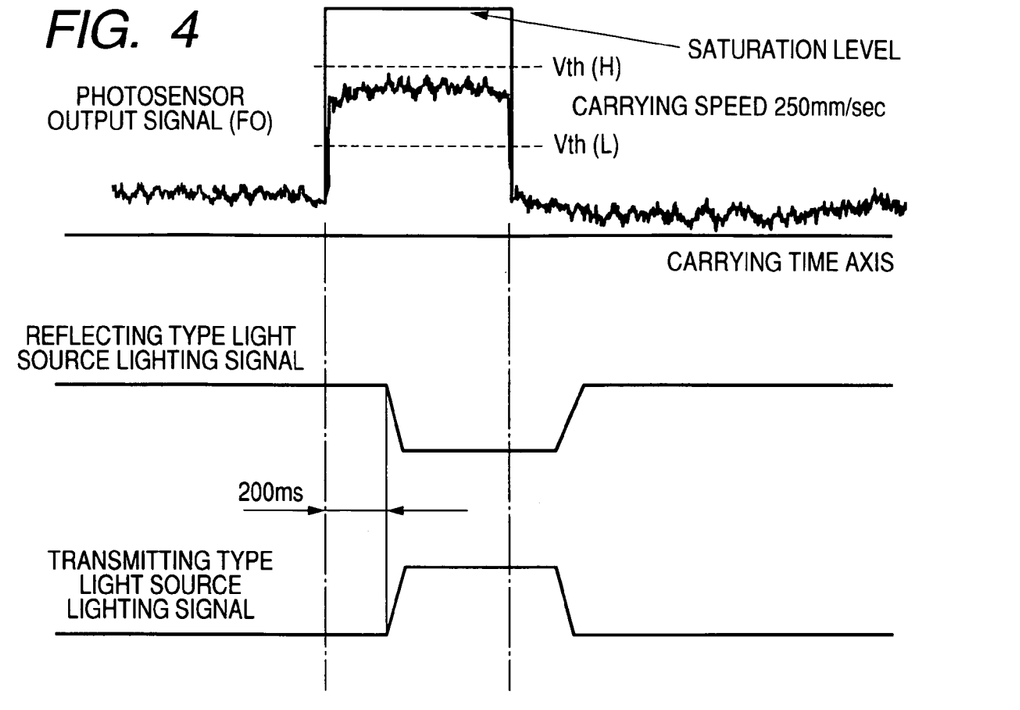
FIG. 4 is a timing chart diagram of the image reading apparatus according to Embodiment 1 of the invention.

FIG. 4 illustrates time chart diagrams showing a behavior of changing a relationship between an output signal (FO) of the photosensor 6 and lighting signals of the reflecting type light source 3 and the transmitting light source 21 with respect to a time axis. The draft 1 is assumed to be carried by, for example, 250 mm/sec. When the draft 1 at the photosensor 6 is constituted by the reflecting portion, the output signal (FO) of the photosensor 6 is at a low level and therefore, the reflecting type light source 3 is put on (ON) and the transmitting type light source 21 is put off (OFF). However, when the transmitting portion of the draft 1 enters the photosensor 6, the output signal (FO) of the photosensor 6 is at a high level. At this occasion, the reflecting type light source 3 is put off (OFF) and the transmitting type light source 21 is put on (ON) after, for example, 200 ms from a time point at which the output signal of the photosensor 6 rises in a predetermined level range of the output signal (FO) of the photosensor 6, that is, between Vth (L) and Vth (H). Further, the output signal (FO) of the photosensor 6 continues only between Vth (L) and Vth (H).

(Operation of Block Constitution)

Here, a total block constitution diagram shown in FIG. 3A will be explained. First, when the start signal (SI) in synchronism with the clock signal (CLK) of CIS2 is inputted to the light receiving section 10 based on the reading system signal (SCLK), an analog output (SO) photoelectrically converted at the light receiving section 10 is outputted by the timing. The analog signal (SO) is amplified by the variable amplifier 37, thereafter, subjected to analog to digital (A/D) conversion by the A/D converter 38 and is inputted to the correcting circuit 39 and the checking circuit 40. At the correcting circuit 39, shading correction, a total bit correction including sample hold and the like are executed. In correcting digital signal data provided from the output SO, digital data stored with previously set reference signal data is read from a region of RAM 1 and is subjected to an operation processing by image information sampled from the draft 1 and the correcting circuit 39. The operation is carried out for making the photoelectrically converted output by the light receiving section 10 uniform in consideration of dispersions in individual elements of the reflecting type light source 3 constituting the CIS 2, the rod lens array 9 and the light receiving section 10 or the like.

Further, with regard to the checking circuit 40 integrated to the correcting circuit 39, a constitution thereof is shown in FIG. 3B. The checking circuit 40 reads digital data in correspondence with a previously determined image pattern of the image signal at the transmitting portion of the draft 1 from RAM 2 and checks the digital data with image data at the transmitting portion which is actually read. That is, when the image at the transmitting portion of the draft 1 is read by putting on the transmitting type light source 21, as described above, the transmitting portion of the draft 1 is read by putting off the reflecting type light source 3 contained in CIS2, an illuminance provided in this way is photoelectrically converted by the light receiving section 10 to constitute an image output signal (SIG). Further, the image output signal (SIG) is compared to check with the image data of the transmitting portion contained in RAM 2 and when the signal coincides with the image data, a coincidence signal (A) is outputted to outside.

Meanwhile, transmitting light from the transmitting type light source 21 is direct light and therefore, an illuminance thereof is larger than an illuminance of light reflected by the reflecting type light source 3. Therefore, a lower limit of an output at the transmitting portion of the draft 1 is set, and an output larger than the set value output is taken out as line information of 1 line. This is illustrated as a waveform diagram extracted in FIG. 3A. The output larger than the set value output is checked for respective lines with regard to presence or absence of a portion similar to data contained in RAM 2 in this way. For example, in reading CIS2 having a revolution of 8 dots/mm, an average data of consecutive 4 bits is compared with data contained in RAM 2 and is determined with regard to a plurality of portions by a shape of an envelope of the digital data. Further, the operation is successively carried out for respective lines and when the coincidence signal (A) is generated over the plurality of lines, on the reading system side, true or false of the draft 11 is checked.

Figure 5:
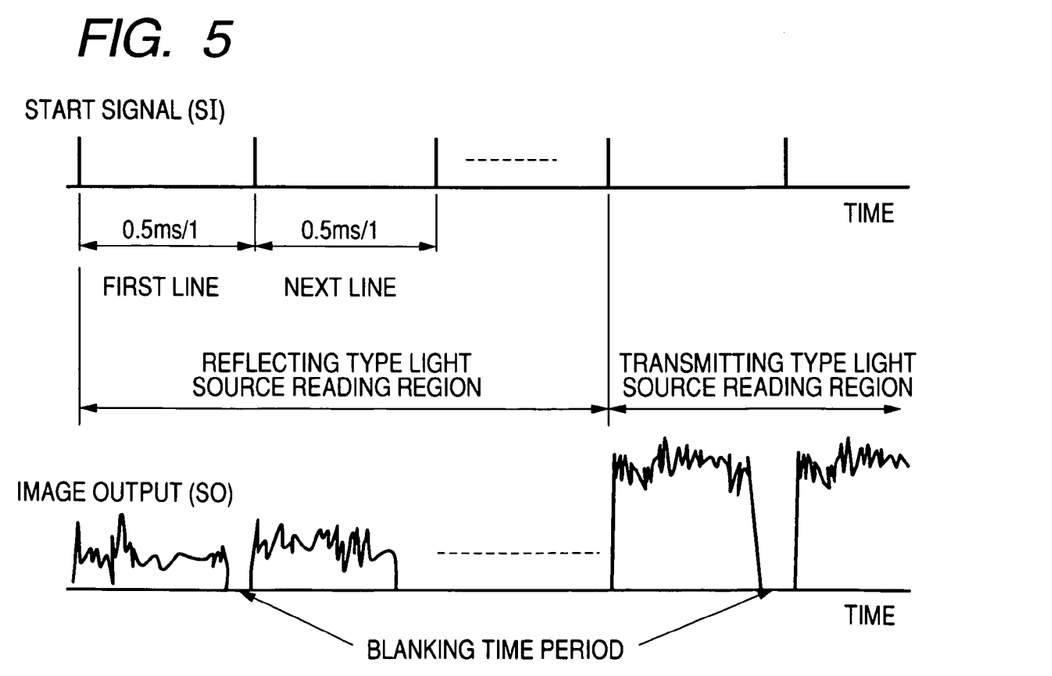
FIG. 5 is an image output characteristic diagram of the image reading apparatus according to Embodiment 1 of the invention.

FIG. 5 is an output waveform characteristic diagram with respect to a time axis showing the image output (SO) at a region of reading the draft 1 by the reflecting type light source 3 at each of 1 line of a reading period (0.5 ms) and the image output (SO) at a region of reading by the transmitting type light source 21. Whereas an output level of the image output (SO) of reading by the reflecting type light source 3 is low since scattered light from the draft 1 is received, an output level of the image output (SO) of reading by the transmitting type light source 21 becomes high since direct light of the transmitting type light source 21 is received by transmitting the draft 1. At the transmitting portion of the draft 1, change in the image data of the output superposed on direct light is compared with RAM 2 data with regard to similarity thereof by providing a constant threshold and therefore, detection of coincidence or incoincidence is facilitated by an image processing.

(Checking)

Next, a checking method will further be explained in reference to FIGS. 3A and 3B. When the banknote (draft) 1 having the watermark portion (transmitting portion) is carried along a longitudinal direction thereof, a size of the banknote 1 is normally equal to or smaller than 80 mm and therefore, in CIS having a specification of a resolution of 8 dots/mm, an effectively reading region of 640 bits is provided. The image output (SO) of the analog signal is converted into the digital output by the A/D conversion, subjected to the shading correction by the correcting circuit 39 and is transmitted to the reading system from SIG as the image output. The output of the correcting circuit 39 is commonly transmitted to the checking circuit 40 and the checking circuit 40 compares to check the watermark image arranged at the watermark region with the watermark image data previously contained in RAM 2.

Figure 6A:
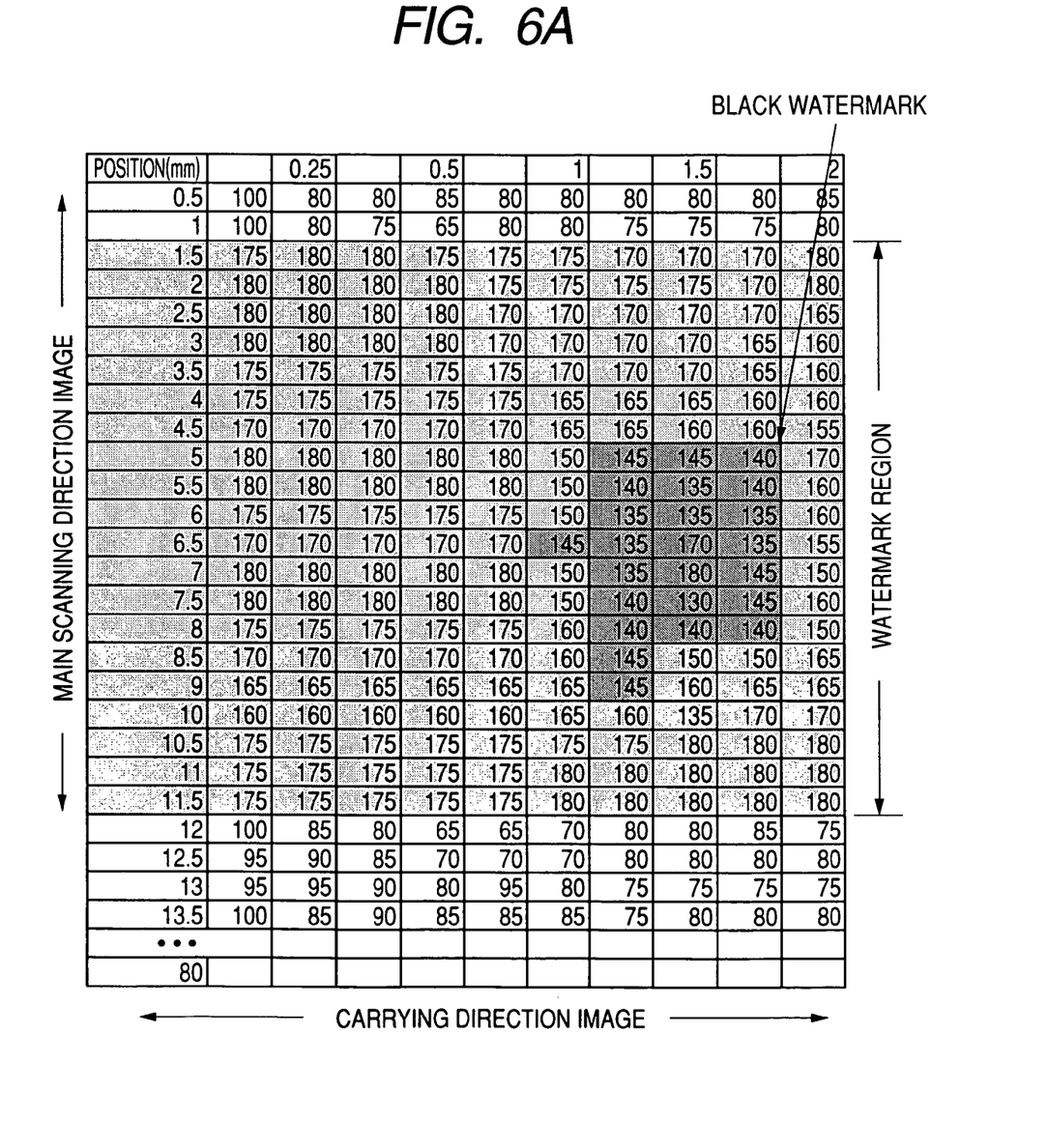
FIGS. 6A and 6B illustrate image digital output diagrams of the image reading apparatus according to Embodiment 1 of the invention.
Figure 6B:
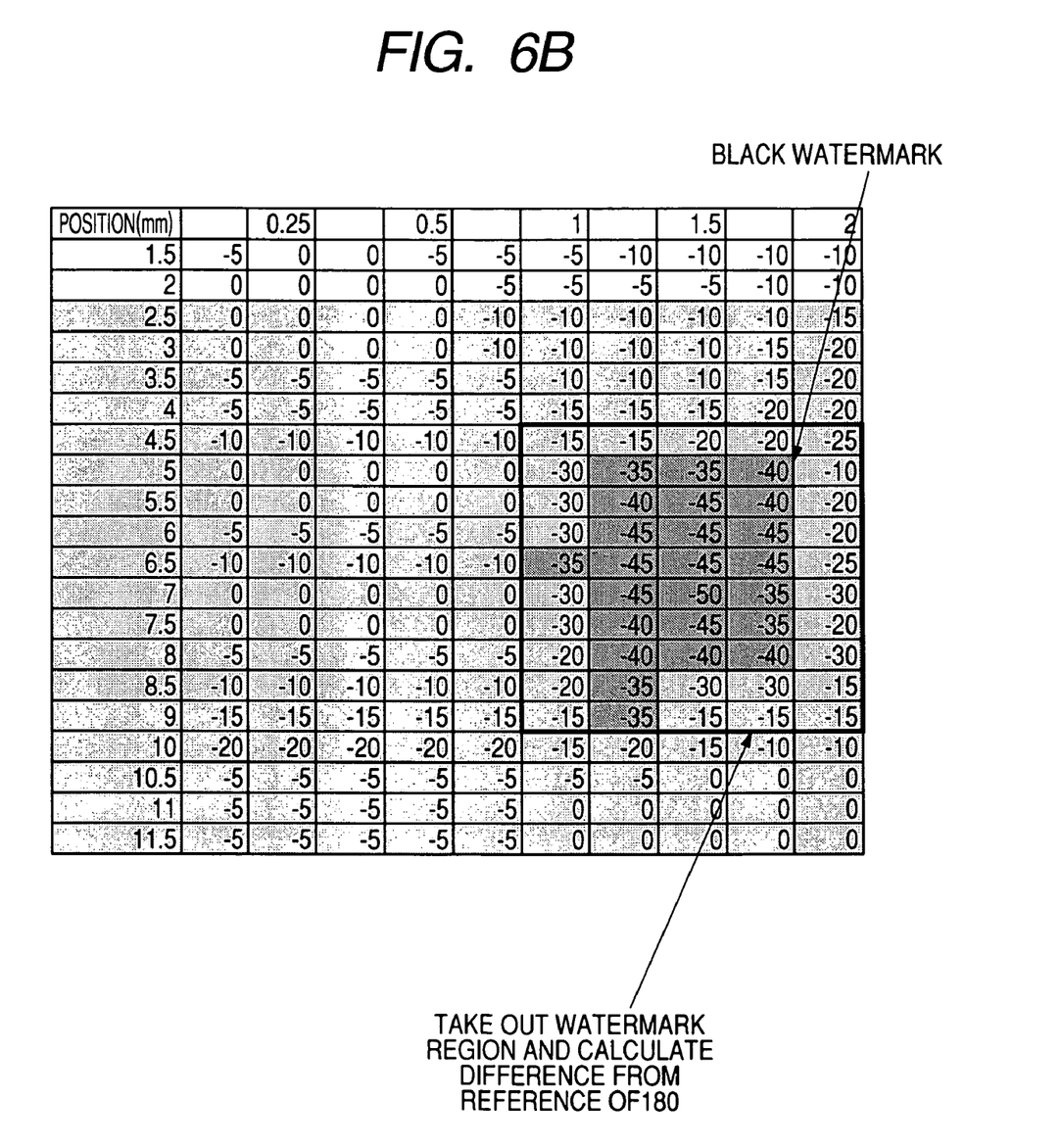

FIG. 6A is a digital output diagram expressing a digital output constituted by averaging the image data from the image output (SO) converted by the A/D conversion simply a unit of 4 bits. The A/D converter 38 having a resolution of 8 bits is used and therefore, the larger the numerical value, the larger the output by being expressed by 256 digits. Data for each line (1) inputted to the checking circuit 40 is first, operated to be processed to average and is contained in a register (shift register). According to Embodiment 1, bits of the register are 160 bits. Next, the image of the through region is checked and therefore, in order to erase unnecessary data other than the watermark region, a reference output is set to 180, a difference between the reference output and respective data is calculated and data equal to or smaller than 100 digits is deleted. (FIG. 6B).

Figure 7A:
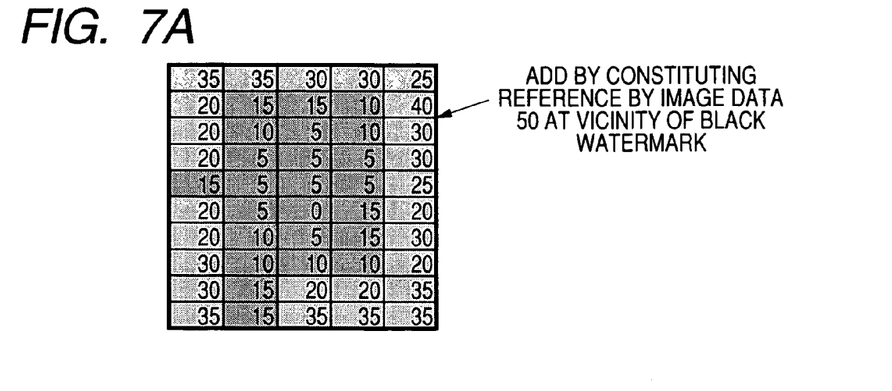
FIGS. 7A and 7B illustrate image digital output diagrams of the image reading apparatus according to Embodiment 1 of the invention.
Figure 7B:
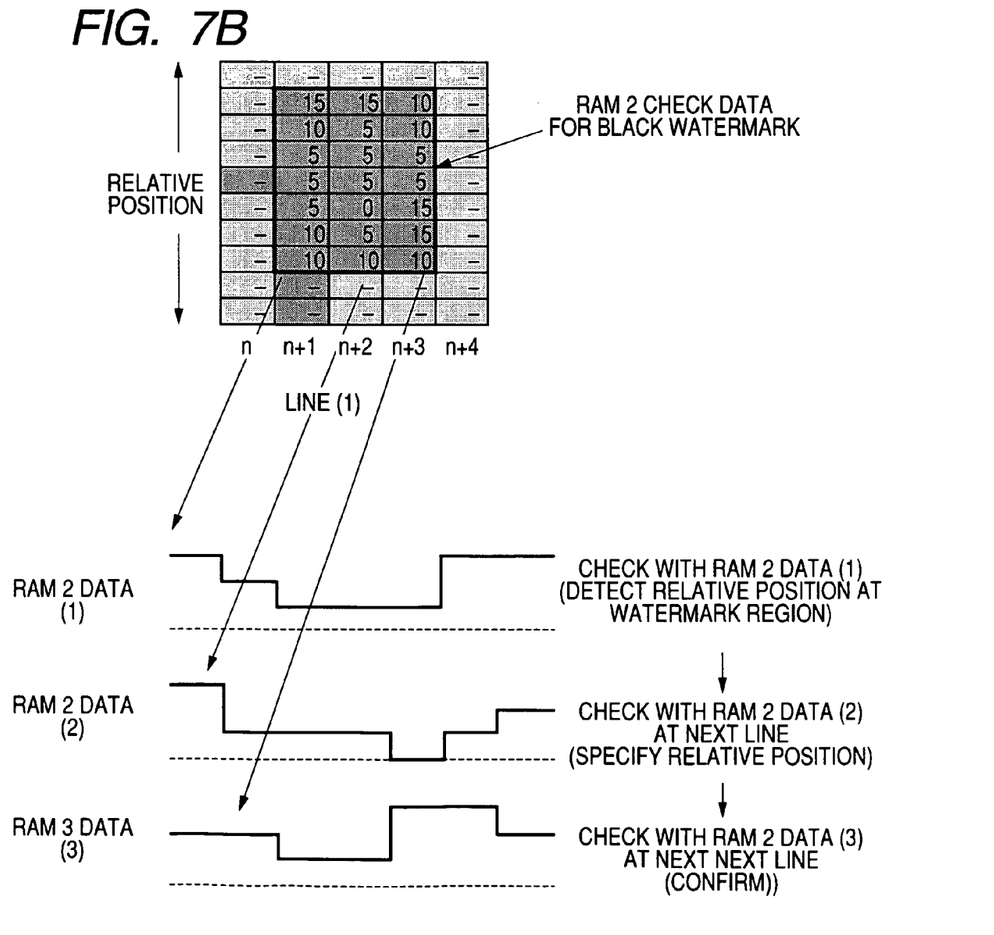

Next, as shown by FIG. 7A, in order to specify the watermark image of the through region, a minimum output of the watermark image is set (the reference output is −50 according to Embodiment 1), and an absolute value of the value is added to each output. On the other hand, RAM 2 is previously stored with image data of the black watermark portion shown in FIG. 7B to compare with the data of the watermark region transmitted for each line. In comparison, image data contained in a bidirectional register is transmitted bidirectionally to compare with RAM 2 data (1) by utilizing a reading time period of a next line.

Next, from a number of times of shift of the shift register (register), a pixel position of CIS2 is specified and therefore, at the next line, data at the position of the specified pixel is transmitted to the shift register, latched, thereafter, compared with RAM 2 data (2) to check. Although the coincidence output (A) may be transmitted to the reading system at the time point, image data of next line is similarly compared to check with RAM 2 data (3) to constitute a coincidence output.

Although in the above-described, the image output from the image output (SO) is constituted by the output which is constituted by averaging 4 bits, this is because the watermark region image is regarded to be a comparatively coarse image. Further, because in irradiating from the transmitting type light source 21, the image is read by the direct light and therefore, the image output includes the output of the direct light. Further, the averaged output is constituted also in consideration of stain or the like of the watermark region. That is, the image of the watermark region is read to determine by a resolution of 2 bits/mm. Therefore, when the watermark image is determined by a higher density, an image with high accuracy can be read by adapting CIS having a resolution of 12 dots/mm. Further, although there are black watermark (a portion having a thick thickness and dark watermark and white watermark (a portion having thin thickness) in the watermark region, at an image portion of the white watermark, an amount of transmitting of the transmitting type light source 21 is high, when the reflecting type light source is put on, in the case of the white watermark, the thickness is thin and therefore, the transmitting amount is high and therefore, by constituting check data of RAM 2 by data only of the white watermark region, even when the side of the reflecting type light source is brought into the lighted state, proper true or false determination can be carried out with regard to the watermark region.

Figure 8A:
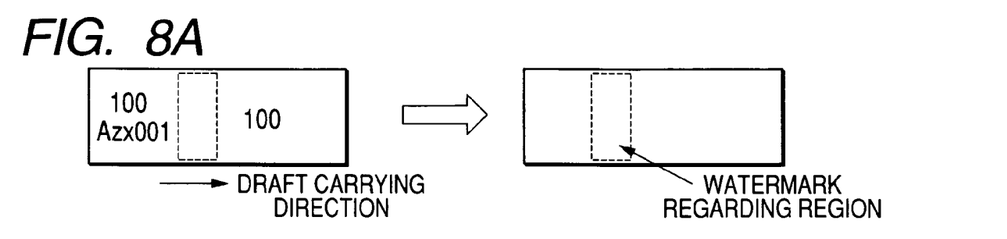
FIGS. 8A to 8E illustrate explanatory views for explaining various watermark regions.
Figure 8B:
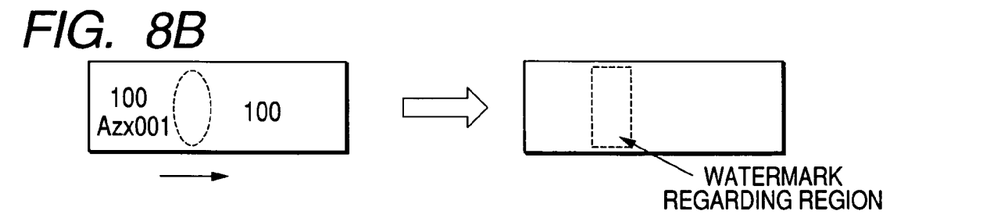
Figure 8C:
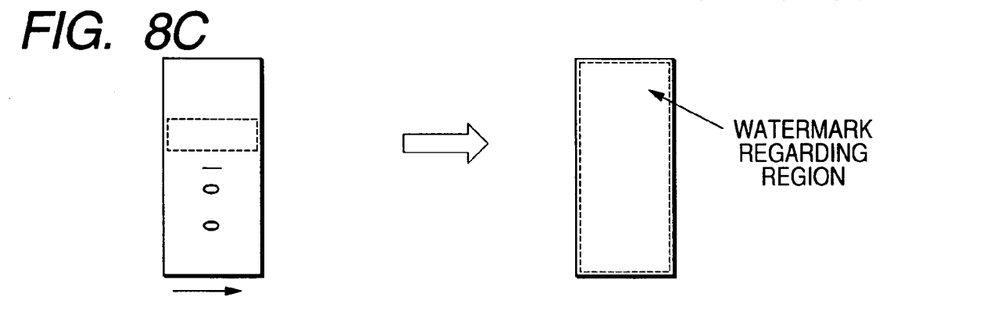

FIGS. 8A to 8E illustrate explanatory views for explaining various watermark regions, FIG. 8A shows a watermark region when a banknote having a rectangular watermark is carried in a longitudinal direction. FIG. 8B shows a watermark region when a banknote having a watermark in an elliptical shape is carried in a longitudinal direction. Further, FIG. 8C shows a watermark region when a banknote having a rectangular watermark in a short side direction is carried. Therefore, according to a carrying method under a condition shown in FIG. 8C, substantially a total region of the banknote 1 becomes a watermark region, an image other than an inherent watermark region of the banknote 1 makes the reflecting type light source OFF and therefore, the watermark cannot be read. An explanation will be given thereof in Embodiment 2.

Embodiment 2

Figure 8D:
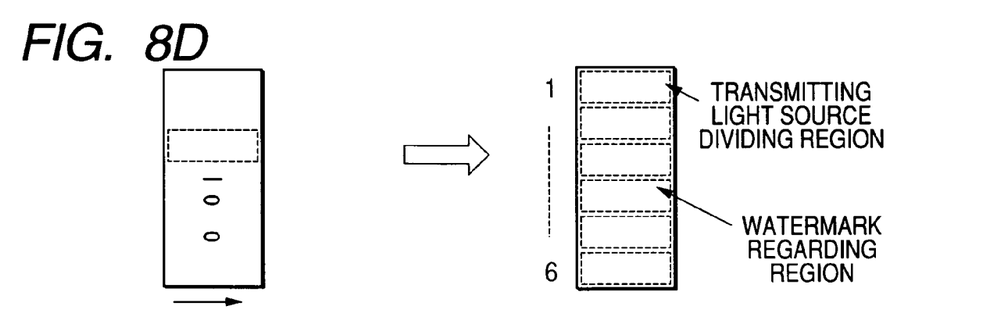
Figure 8E:
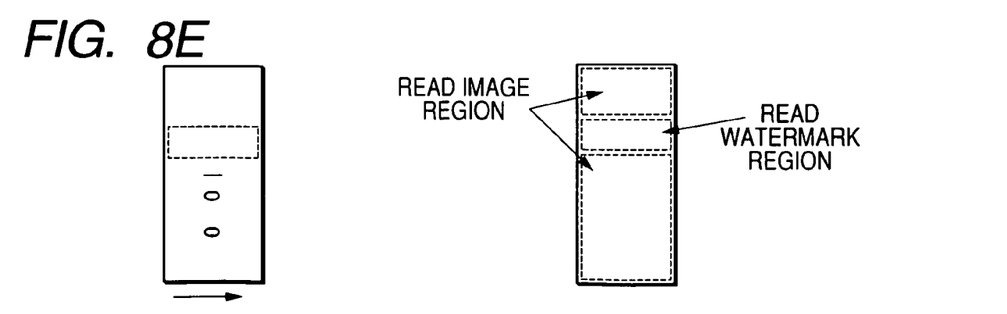
Figure 9:
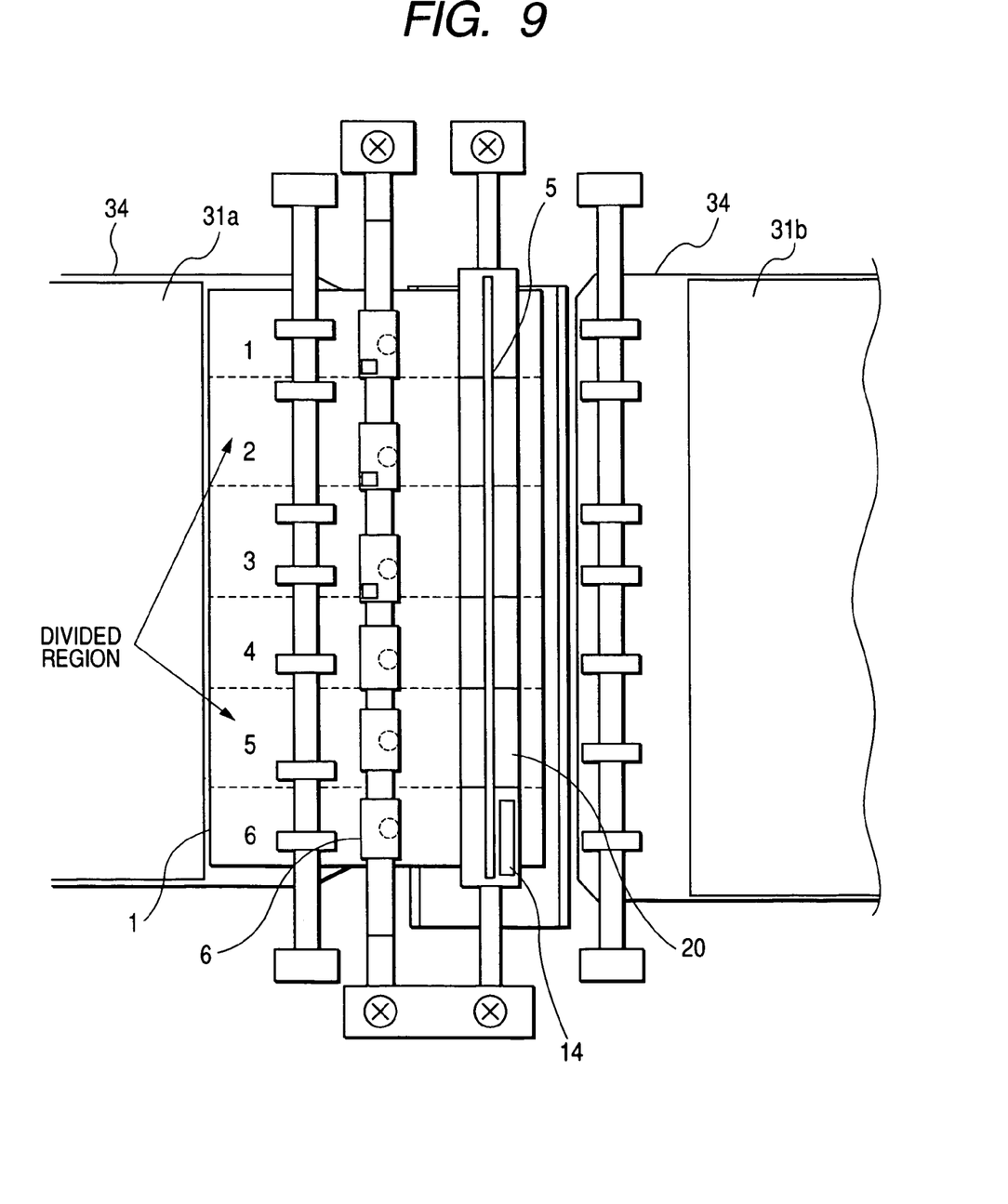
FIG. 9 is a plane constitution view of an image reading apparatus according to Embodiment 2 of the invention.

Embodiment 2 of the invention will be explained in reference to FIG. 9 and the like as follows. FIG. 9 is a plane constitution view of an image reading apparatus according to Embodiment 2. According to Embodiment 2, an explanation will be given of a case of carrying the banknote 1 in a short side direction. In FIG. 9, 6 pieces of the photosensors 6 are installed to be spaced apart from each other by a predetermined interval, and the watermark region of the banknote 1 is specified by also dividing the inner circuit of the transmitting type light source 21 by 6. That is, as shown by FIG. 8D, the watermark region is divided into 6 portions with respect to the inherent watermark.

When the watermark portion of the banknote 1 is present partially in the main scanning direction of the banknote 1, with regard to the photosensor 6, for example, as shown by FIG. 9, 6 pieces of the photosensors 6 are provided along the main scanning direction. Thereby, when the watermark portion is present only at a center portion of the banknote 1, only the photosensor 6 in correspondence therewith detects the watermark portion, and the other photosensors 6 do not detect the watermark portion. In such a case, the transmitting type light source 21 may be constituted to be divided by 6 respectively in correspondence with the photosensors 6 to be able to be put on individually.

Then, when only a portion of the photosensor 6 detects the watermark portion, in the case in which the watermark portion enters the irradiated portion 5, only a light source at the center portion of the transmitting type light source 21 in correspondence with the photosensor 6 is put on. That is, at that occasion, light sources at both end portions of the transmitting type light source 21 may be put off. In this way, the watermark portion at the center portion of the banknote 1 is made to be able to be read by the light source of the center portion of the transmitting type light source 21. On the other hand, when the reflecting type light source 3 is divided by, for example, 6 along the main scanning direction of the banknote 1 similar to the transmitting type light source 21, in the above-described case, by putting off the center portion of the reflecting type light source 3 and putting on the both end portions, also the reflecting portions of the both end portions of the transmitting portion of the banknote 1 are made to be able to be read.

Embodiment 3

Although according to Embodiment 1 and Embodiment 2, the image is read and checked from a difference in the amount of transmitting light at the watermark portion of the banknote 1, an explanation in Embodiment 3 will be given of a case in which a fluorescent ink is provided to a watermark image or a case in which the watermark portion is printed with a pattern provided with the fluorescent ink.

Figure 10:
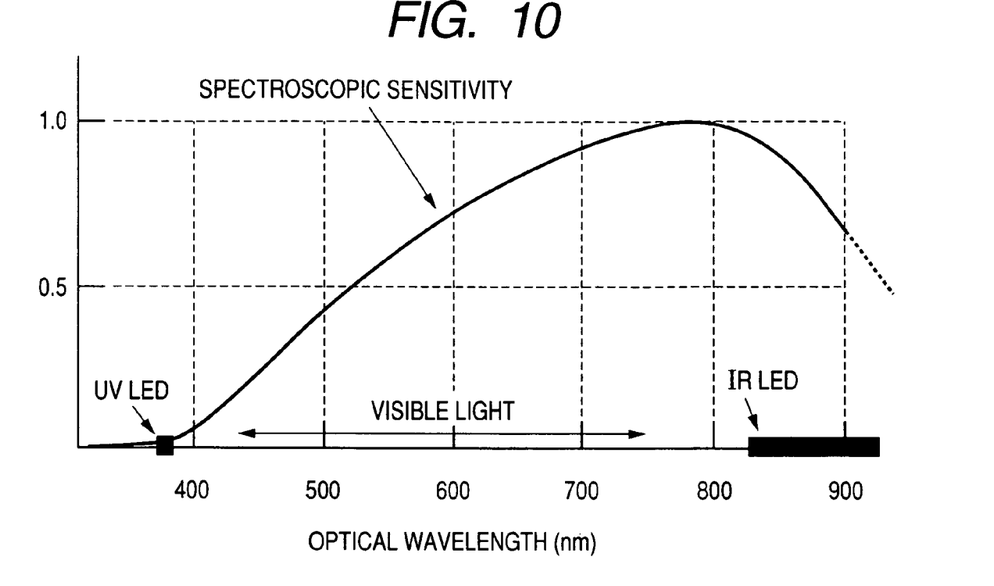
FIG. 10 is a spectroscopic sensitivity diagram for explaining an image reading apparatus according to Embodiment 3 of the invention.
Figure 11:
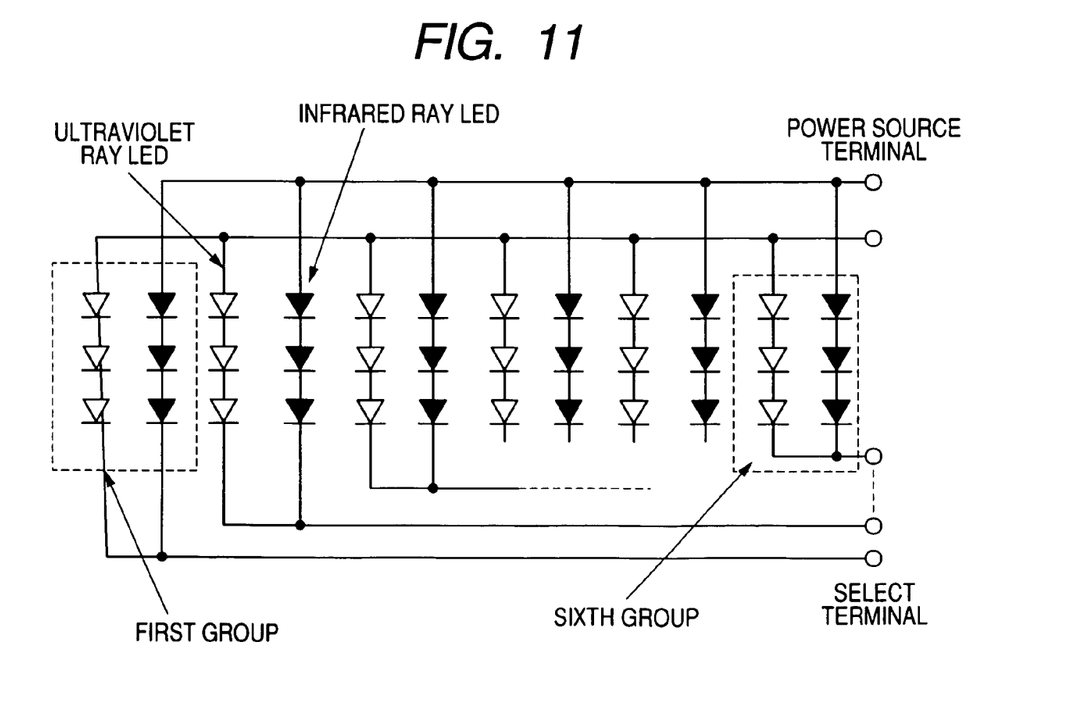
FIG. 11 is a wiring diagram of LED of the image reading apparatus according to Embodiments 1 through 3 of the invention.

FIG. 10 is a spectroscopic sensitivity diagram showing a spectroscopic sensitivity of the light receiving portion 10. According to a light receiving sensitivity of the light receiving section 10, the sensitivity is high on an infrared ray side and the sensitivity is low on an ultraviolet ray side. Further, FIG. 11 is a wiring diagram mounted with an infrared ray LED and an ultraviolet ray LED. According to Embodiment 3, an explanation will be given of a case of applying an ultraviolet ray LED (UV LED) having an optical wavelength ($\lambda$) of 375±2 nm and being mounted with a transmitting member coated or printed with an ultraviolet ray cut filter on sale in place of the transmitting member 8 of Embodiments 1 and 2.

Ultraviolet ray irradiated from the transmitting type light source 21 to a fluorescent ink coated on the watermark region of the banknote 1 is converted into visible light at a fluorescence region printed on the banknote 1 and is received by the light receiving section 10. Further, ultraviolet ray from the transmitting type light source 21 is blocked by the above-described transmitting member and therefore, the ultraviolet ray is not transmitted to the light receiving section 10. Further, as shown by FIG. 10, fluorescent visible light shows the excellent light receiving sensitivity from purple to red color range and therefore, in driving the light source of Embodiment 3, by putting off visible light LED mounted to the reflecting type light source 3, not only presence or absence of the fluorescent ink or the like coated on the watermark region sufficiently but also true or false of an ink coating pattern can be detected by containing data of a region of coating the fluorescent ink in RAM 2 shown in FIG. 3A.

That is, according to the transmitting type light source 21, as shown by the wiring diagram of LED of FIG. 11, by constituting a group of 6 pieces mounted with infrared ray light sources (IR LED) and ultraviolet ray light sources, reading is carried out by dividing a reading region of the banknote 1 by 6. In details, by corresponding positions of dividing the photosensor 6 and positions of dividing the transmitting type light source 21 to each other and detecting presence of the watermark of the banknote 1 coated with the fluorescent ink at any of divided regions, similar to Embodiments 1 and 2, not only a position of the watermark region can be detected, the watermark image can be read and true or false can be determined but also a region of reading the image other than the watermark region is enlarged.

Further, although according to Embodiment 3, visible light from the fluorescent ink is received by the light receiving section 10 by irradiating the ultraviolet ray light source, ultraviolet ray of the transmitting type light source may include secondary visible light. Further, although the transmitting member coated with an ultraviolet ray cut filter is used, as shown by FIG. 10, the sensitivity of the light receiving section 10 with regard to ultraviolet ray is low and therefore, even when the ultraviolet ray cut filter is not used, true or false can be checked properly.

Further, although according to Embodiments 1 and 2, by using the ultraviolet ray light source as the LED chip of the second light source 21, an output larger than other visible light LED of red, blue, green or the like can be provided, a photoelectrically converted output of the light receiving section 10 is increased and therefore, accuracy of reading the image and accuracy of determining true or false are promoted, a proper effect is achieved even when visible light LED is used for the transmitting type light source 21. Further, according to LED of the reflecting type light source 3, the image can be read properly by using not only visible light but also infrared light by using a wavelength thereof pertinently at a plurality of wavelengths of 820 nm, 880 nm, 940 nm and the like.

What is claimed is:

1. An image reading apparatus comprising:
a carrying unit that carries an irradiated object having a light reflecting portion and a light transmitting portion in a carrying direction;
a first light source arranged on one face side of the irradiated object that irradiates light to a light irradiated portion of a path of carrying the irradiated object;
a second light source arranged on other face side of the irradiated object that irradiates light to the light irradiated portion;
a detecting unit arranged to be spaced apart from the light irradiated portion by a predetermined distance in a direction reverse to the carrying direction that detects the light transmitting portion of the irradiated object;
a lighting control unit that controls to put on the second light source during a time period of passing the light transmitting portion through the light irradiated portion by the detecting unit;
a lens array arranged on the one face side of the irradiated object that converges both reflecting light reflected by the light reflecting portion of the irradiated object at the light irradiated portion and transmitting light transmitting through the light transmitting portion; and
a sensor that receives both the reflecting and transmitting light converged by the lens array.

2. An image reading apparatus comprising:
a carrying unit that carries an irradiated object having a light reflecting portion and a light transmitting portion in a carrying direction;
a first light source arranged on one face side of the irradiated object that irradiates light to a light irradiated portion of a path of carrying the irradiated object;
a second light source arranged on other face side of the irradiated object that irradiates light to the light irradiated portion;
a detecting unit arranged to be spaced apart from the light irradiated portion by a predetermined distance in a direction reverse to the carrying direction that detects the light transmitting portion of the irradiated object;
a lighting control unit that controls to put on the second light source during a time period of passing the light transmitting portion through the light irradiated portion by the detecting unit;
a lens array arranged on the one face side of the irradiated object that converges both reflecting light reflected by the light reflecting portion of the irradiated object at the light irradiated portion and transmitting light transmitting through the light transmitting portion;
a sensor that receives and photoelectrically converts both the reflecting and transmitting light converged by the lens array; and
a checking unit that checks true or false of the irradiated object based on an output signal of the sensor.

3. The image reading apparatus according to claim 1, wherein
the detecting unit includes a light emitting element and a light receiving element, and
the irradiated object is carried between the light emitting element and the light receiving element.

4. The image reading apparatus according to claim 2, wherein
the detecting unit includes a light emitting element and a light receiving element, and
the irradiated object is carried between the light emitting element and the light receiving element.

5. The image reading apparatus according to claim 1, wherein
the carrying unit carries the irradiated object at a constant speed, and
the lighting control unit puts on the second light source and puts off the first light source after an elapse of a constant time period from when the light transmitting portion of the irradiated object is detected by the detecting unit.

6. The image reading apparatus according to claim 2, wherein
the carrying unit carries the irradiated object at a constant speed, and
the lighting control unit puts on the second light source and puts off the first light source after an elapse of a constant time period from when the light transmitting portion of the irradiated object is detected by the detecting unit.

7. The image reading apparatus according to claim 1, wherein
the plurality of detecting units are provided in a direction orthogonal to the carrying direction of the irradiated object,
the second light source is divided in correspondence with the detecting units, and
the lighting control unit carries out lighting for respective divided regions thereof.

8. The image reading apparatus according to claim 2, wherein
the plurality of detecting units are provided in a direction orthogonal to the carrying direction of the irradiated object,
the second light source is divided in correspondence with the detecting units, and
the lighting control unit carries out lighting for respective divided regions thereof.

9. The image reading apparatus according to claim 7, wherein
the second light source is an infrared ray light source.

10. The image reading apparatus according to claim 8, wherein
the second light source is an infrared ray light source.

11. The image reading apparatus according to claim 2, wherein
the checking unit compares a digital output signal obtained by A/D converting a digital output signal of the sensor at the light transmitting portion of the irradiated object and an image signal of the light transmitting portion of the irradiated object stored to a storing unit.

12. The image reading apparatus according to claim 2, wherein
the checking unit compares a digital output signal obtained by deleting a digital output signal at the light transmitting portion of the irradiated object having a level equal to or smaller than a predetermined level and a digital image signal of the light transmitting portion of the irradiated object stored to a storing unit.

13. The image reading apparatus according to claim 11, wherein
the checking unit includes an averaging unit that averages the digital output signal at the light transmitting portion of the irradiated object.

14. The image reading apparatus according to claim 12, wherein
the checking unit includes an averaging unit that averages the digital output signal at the light transmitting portion of the irradiated object.

15. The image reading apparatus according to claim 11, wherein the checking unit includes a register that holds a digital output signal on each of scanning lines.

16. The image reading apparatus according to claim 12, wherein
the checking unit includes a register that holds a digital output signal on each of scanning lines.

17. The image reading apparatus according to claim 11, wherein
the storing unit stores an image data of a black watermark portion or a white watermark portion, or an image data of a data of a region coated with a fluorescent ink.

18. An image reading apparatus comprising:
a carrying unit that carries an irradiated object having a light reflecting portion and a light transmitting portion and coated with a fluorescent ink at the light transmitting portion in a carrying direction;
a first light source arranged on one face side of the irradiated object that irradiates light to a light irradiated portion of a path of carrying the irradiated object;
a second light source arranged on other face side of the irradiated object that irradiates an ultraviolet ray to the light irradiated portion;
a detecting unit arranged to be spaced apart from the light irradiated portion by a predetermined distance in a direction reverse to the carrying direction that detects the light transmitting portion of the irradiated object;
a lighting control unit that controls to put on the second light source and put off the first light source during a time period of passing the light transmitting portion through the light irradiated portion by the detecting unit;
a lens array arranged on the one face side of the irradiated object that converges both reflecting light reflected by the light reflecting portion of the irradiated object at the light irradiated portion and transmitting light transmitting through the light transmitting portion; and
a sensor that receives both the reflecting and transmitting light converged by the lens array.

19. An image reading apparatus comprising:
a carrying unit that carries an irradiated object having a light reflecting portion and a light transmitting portion and coated with a fluorescent ink at the light transmitting portion in a carrying direction;
a first light source arranged on one face side of the irradiated object that irradiates light to a light irradiated portion of a path of carrying the irradiated object;
an ultraviolet ray cut filter provided at the light irradiated portion between the first light source and the irradiated object that removes an ultraviolet ray;
a second light source arranged on other face side of the irradiated object that irradiates an ultraviolet ray to the light irradiated portion;
a detecting unit arranged to be spaced apart from the light irradiated portion by a predetermined distance in a direction reverse to the carrying direction that detects the light transmitting portion of the irradiated object;
a lighting control unit that controls to put on the second light source and put off the first light source during a time period of passing the light transmitting portion through the light irradiated portion by the detecting unit;
a lens array arranged on the one face side of the irradiated object that converges both reflecting light reflected by the light reflecting portion of the irradiated object at the light irradiated portion and transmitting light transmitting through the light transmitting portion; and
a sensor that receives both the reflecting and transmitting light converged by the lens array.

* * * * *